(12) United States Patent
Cherkassky et al.

(10) Patent No.: US 10,461,964 B1
(45) Date of Patent: Oct. 29, 2019

(54) HIGH OUTPUT SWING HIGH VOLTAGE TOLERANT BUS DRIVER

(71) Applicant: Silicon Laboratories Inc., Austin, TX (US)

(72) Inventors: Alexander Cherkassky, Hollis, NH (US); Bruce P. Del Signore, Hollis, NH (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/169,757

(22) Filed: Oct. 24, 2018

(51) Int. Cl.
*H04L 25/02* (2006.01)

(52) U.S. Cl.
CPC ........ *H04L 25/028* (2013.01); *H04L 25/0276* (2013.01)

(58) Field of Classification Search
CPC ... H04L 25/028; H04L 25/08; H04L 25/0272; H04L 25/0276; G06F 13/4072; H03K 19/00315
USPC ............. 326/83, 86, 87, 108; 361/91.1, 111; 327/109
See application file for complete search history.

(56) References Cited

U.S. PATENT DOCUMENTS

| | | | |
|---|---|---|---|
| 6,154,061 A | 11/2000 | Boezen et al. | |
| 7,667,939 B2 | 2/2010 | Kiuchi | |
| 8,324,935 B2 | 12/2012 | Boezen | |
| 8,971,387 B2 * | 3/2015 | Davis | H04L 25/0292 327/530 |
| 2006/0091915 A1 * | 5/2006 | Pauletti | H04L 25/0284 327/108 |
| 2009/0180570 A1 * | 7/2009 | Koh | G05F 1/56 375/295 |

* cited by examiner

*Primary Examiner* — Seokjin Kim
(74) *Attorney, Agent, or Firm* — Zagorin Cave LLP

(57) ABSTRACT

A driver circuit includes two pull-up portions coupled respectively between VDD and first and second driver output nodes and two pull-down sections coupled respectively between ground and third and fourth driver output nodes. The driver circuit is configurable as an RS485 driver or a CAN driver. The active diodes in the pull-up sections are turned off when necessary to prevent unwanted reverse currents between the first and second output nodes and VDD. The active diodes in the pull-down sections are turned off when necessary to prevent unwanted reverse current between ground and the third and fourth output nodes.

20 Claims, 8 Drawing Sheets

HIGH OUTPUT SWING HIGH VOLTAGE TOLERANT BUS DRIVER

BACKGROUND

Field of the Invention

The disclosure herein relates to industrial transceivers and more particularly to high swing bus drivers capable of withstanding high voltages at reduced supply levels.

Description of the Related Art

Industrial drivers supporting such standards as Control Area Network (CAN) and RS485 typically have difficulty complying with minimum output signal swing requirements when operating with reduced voltage supplies, e.g., 3.3V and below. Automotive applications use the CAN standard to connect various electronic controls found throughout modern automobiles. Modern industrial control utilizes RS485 communications. Such drivers operate over differential twisted pair networks and often require the bus driver to be able to correctly function when the bus reference ground differs from that of the driver ground by up to +/−12V. In addition, the bus driver outputs must be able to withstand voltages of up to +/−80V while not interfering with other transceivers communicating on the network. These drivers typically employ diodes in series with transistor switches, which limit the amount of available signal amplitude or swing, particularly when the driver supply voltage is reduced to 3.3V or below. That results in degraded specifications on the driver output swing for such low-voltage parts with the effect of degraded signal transmission. Additionally, such drivers typically employ different architectures for RS485 and CAN standards and also for 5V and 3.3V supply operations resulting in having to design and manufacture multiple parts.

FIGS. 1A and 1B show, respectively, typical conventional CAN and RS485 driver circuit topology. In FIG. 1A, the conventional CAN driver circuit includes the CMOS devices P1 (PMOS switch) and N1 (NMOS switch), which connect the terminals A and B of the load $Z_L$ to supply and ground, respectively.

In the case of RS485 standard as shown in FIG. 1B, the terminals of the load $Z_L$ are connected to VDD and GND to generate one polarity or GND and VDD respectively to generate the complementary polarity. Thus, the RS485 driver uses four switches (P1, P2, N1, and N2). In the case of CAN, as shown in FIG. 1A, the terminals of the load are connected to VDD and GND to generate one polarity, or the load is left disconnected by turning OFF switches P and N. The diodes D1, D2, D3, and D4 in the case of RS485 and D1 and D2 in the case of CAN, serve the purpose of blocking unwanted current flow through the P or N switches when either the positive (top) load terminal is connected to voltage exceeding the VDD supply or the negative (bottom) load terminal is connected to voltage below GND. Thus, two switches and two diodes form the path through which the current flows to the load. Since the diode has a fundamental forward voltage drop of Vbe ~0.8V, the two blocking diodes in the path present an additional voltage drop of ~1.6V, which reduces the supply headroom available for the driver to generate the output signal.

SUMMARY OF EMBODIMENTS OF THE INVENTION

Accordingly, embodiments provide drivers better able to handle low voltage supplies and/or provide driver circuits capable of handling multiple driver protocols.

In one embodiment an apparatus includes a driver circuit that includes a first pull-up portion. The first pull-up portion includes a first transistor that has a first current carrying terminal coupled to a first voltage supply node and has a second current carrying terminal coupled to a third current carrying terminal of a second transistor. The second transistor has a fourth current carrying terminal coupled to an output node of the driver circuit. A reverse current control circuit turns off the second transistor responsive to a first voltage associated with the output node being higher than a reference voltage.

In another embodiment an apparatus includes a driver circuit having a first pull-up portion. The first pull-up portion includes a first transistor coupled between a first voltage supply node and a second transistor. The second transistor is serially coupled between the first transistor and a first output node of the driver circuit. A first reverse current control circuit turns off the second transistor responsive to a first voltage associated with the first output node being higher than a reference voltage to thereby prevent an undesired reverse current from flowing between the first output node and the first voltage supply node. The driver circuit further includes a second pull-up portion that includes a third transistor coupled between the first voltage supply node and a fourth transistor. The fourth transistor is serially coupled between the third transistor and a second output node of the driver circuit. A second reverse current control circuit turns off the fourth transistor responsive to a second voltage associated with the second output node being higher than a second reference voltage to thereby prevent an undesired second reverse current from flowing between the second output node and the first voltage supply node. The driver circuit further includes a first pull-down portion that includes a fifth transistor coupled between a second voltage supply node and a sixth transistor. The sixth transistor is serially coupled between the fifth transistor and a third output node of the driver circuit. A third reverse current control circuit turns off the sixth transistor responsive to a third voltage associated with the third output node being lower than a third reference voltage to thereby prevent an undesired third reverse current from flowing between the second voltage supply node and the third output node. The driver circuit further includes a second pull-down portion that includes a seventh transistor coupled between the second voltage supply node and an eighth transistor. The eighth transistor is coupled between the seventh transistor and a fourth output node of the driver circuit. A fourth reverse current control circuit turns off the eighth transistor responsive to a fourth voltage associated with the fourth output node being lower than the fourth reference voltage to thereby prevent an undesired fourth reverse current from flowing between the second voltage supply node and the fourth output node.

In another embodiment a method includes selectively coupling a first voltage supply node to an output node through a first transistor and through a second transistor according to a first gate control signal for the first transistor and a second gate control signal for the second transistor, the second transistor serially coupled between the first transistor and the output node. The method further includes turning off the second transistor responsive to a first voltage associated with the output node being higher than a reference voltage to thereby block a reverse current from the output node to the first voltage supply node using a body diode of the second transistor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Embodiments herein utilize a new common circuit topology for generating high swing (fully standard complying) bus transmitters operating over differential twisted pair networks capable of withstanding high voltages at normal or reduced voltage supply levels. Embodiments herein provide higher transmission amplitude/output swing, full compliance with standards specifications on output amplitude at normal and low supply voltages of e.g., 3.3V and below. One or more embodiments utilize a single integrated circuit to serve different industrial standards CAN and RS485 and at both standard supply voltage 5V and low voltage 3.3V. Embodiments herein also provide higher energy efficiency—more useful signal for the same headroom or ability to operate at lower supply voltage than prior art approaches. Embodiments also provide automatic current limiting.

Figure 2:
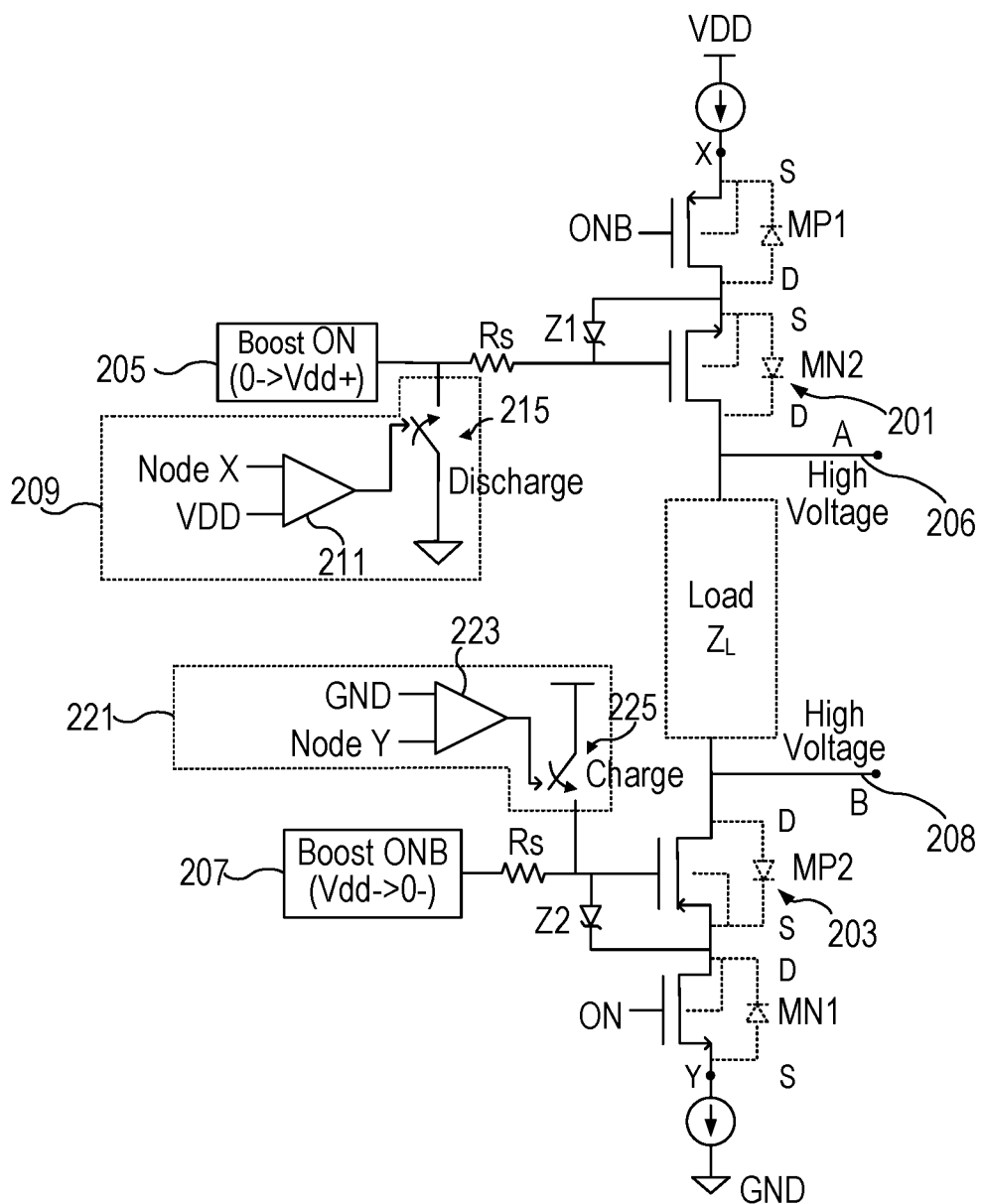
FIG. 2 illustrates an embodiment of a CAN driver.
Figure 3:
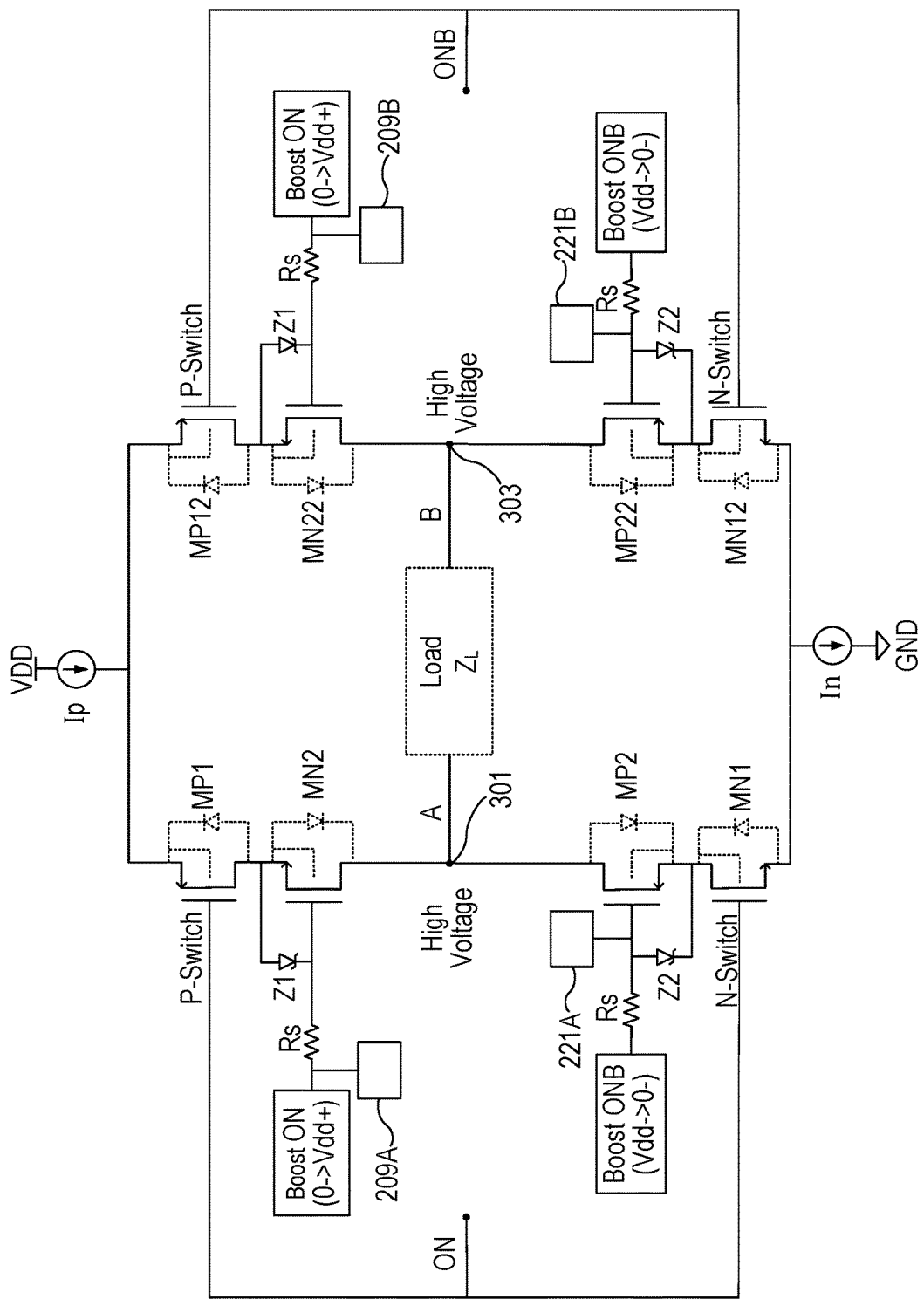
FIG. 3 illustrates an embodiment of an RS485 driver.

FIGS. 2 and 3 illustrate embodiments that address the shortcomings of the prior art systems for CAN and RS485 configurations, respectively. The embodiments of FIGS. 2 and 3 replace the diodes with active MOS devices MN2 and MP2 to block the unwanted currents. Note that these MOS devices contain intrinsic body diodes 201 and 203, but these appear in parallel with and are bypassed by the underlying MOSFETs. Since a MOS device functions as a gate controlled resistor in its triode mode, the Vbe drawback of the diodes in conventional architecture is replaced with Vds of the MOSFET, which in principle can be as low as 0V. Note the unconventional direction of the MOSFETs and their type. Normally the switch elements that connect close to the supply VDD are P-type devices such as MP1 and those that work close to GND are N-type devices such as MN1. However, the topology illustrated in FIGS. 2A and 2B employs an N-type device MN2 at the top close to the supply VDD and a P-type device MP2 at the bottom close to GND. That exposes only device drains to potentially large voltages that may be present on the load terminals. Additionally, the current flow is also reversed from convention for MN2, going from source (S) to drain (D), as opposed to conventional drain to source. That is possible by employing the corresponding MOSFETs in the triode mode where the drain and source differ by only a few hundred mV. In order to generate sufficiently low switch resistance of MP2 and MN2 in embodiments, their gates are driven by elevated gate voltages. Boost circuit 205 boosts the gate voltage for MN2 above VDD. Conventional charge pump circuits may be used to boost the gate voltages for MN2 and MP2. Boost circuit 207 boosts the gate for MP2 to below GND.

In an embodiment the boost circuit 205 boosts the gate voltage of MN2 and then disconnects from the gate allowing the gate to float. The gate will stay charged, subject only to leakage current that slowly discharges the gate. The boost circuit, if needed, periodically charges the gate to ensure that the gate voltage stays above a desired threshold.

Figure 1A:
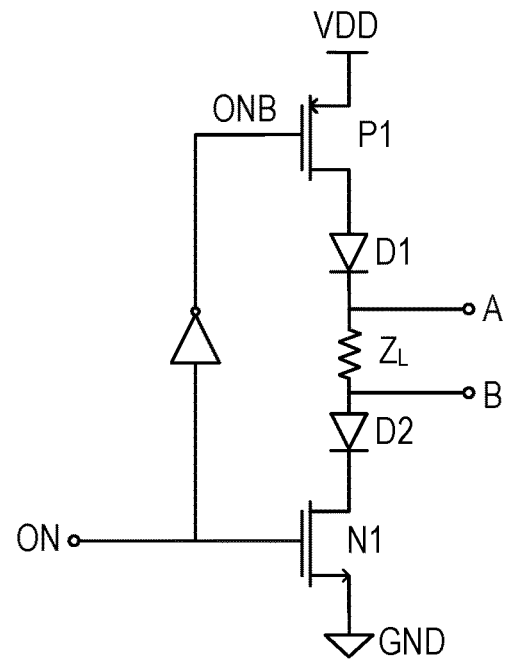
FIG. 1A illustrates a conventional CAN driver.

Another consideration for the driver topology shown in FIG. 2 is the fact that the body diodes are in parallel with the MOS structures. In a CAN environment, the voltage on node A 206 can go above the supply voltage VDD. In a conventional CAN driver shown in FIG. 1A, the diode D1 prevents the high voltage on node A from creating a reverse current path through transistor P1 to the supply voltage node VDD. In FIG. 2, transistor MN2 allows a reverse current to flow from the high voltage on node A to the VDD node through MP1 if node A goes to a voltage above VDD. In order to prevent the body diode 201 from being bypassed and thereby using the body diode 201 to block the undesired reverse current flow from node A to the VDD node in the pullup portion of the driver circuit, the reverse current flow control circuit 209 turns off transistor MN2 when the voltage on node A gets too high. In an embodiment, comparator 211 compares an indication of the voltage on node A to a reference voltage such as VDD. In an embodiment the indication of the voltage on node A is sensed at node X at the source of MP1. If the voltage corresponding to node A rises above VDD, the comparator asserts a switch control signal and closes transistor switch 215 to discharge the gate voltage to ground to thereby turn off MN2 and allow the body diode 201 to block the reverse current that would otherwise flow from node A to the supply voltage node.

The pull-down portion of the driver circuit that couples node B 208 of the load to ground can experience similar problems related to reverse current. Thus, if the voltage of node B falls below ground, the unwanted reverse current is blocked by the body diode 203 but only if the transistor MP2 in parallel with the body diode 203 is turned off. Thus, the PMOS gate voltage is raised to turn off MP2 when the reverse current control circuit 221 detects the need. Comparator 223 compares an indication of the voltage at node B with a reference voltage such as ground and generates an output signal to close the switch 225 if the indication of the voltage at node B goes lower than ground such that a reverse current would flow through MP2 if the transistor MP2 is not turned off. In an embodiment the indication of the voltage on node B is sensed at node Y at the source of MN1. In an embodiment, boost circuit 207 boosts the gate voltage of MP2 to below GND and then disconnects from the gate voltage allowing the gate voltage to float. Closing the switch 225 charges the gate voltage towards VDD to turn off MP2. That allows the body diode 203 to block reverse current that would otherwise flow from node B to GND.

Figure 1B:
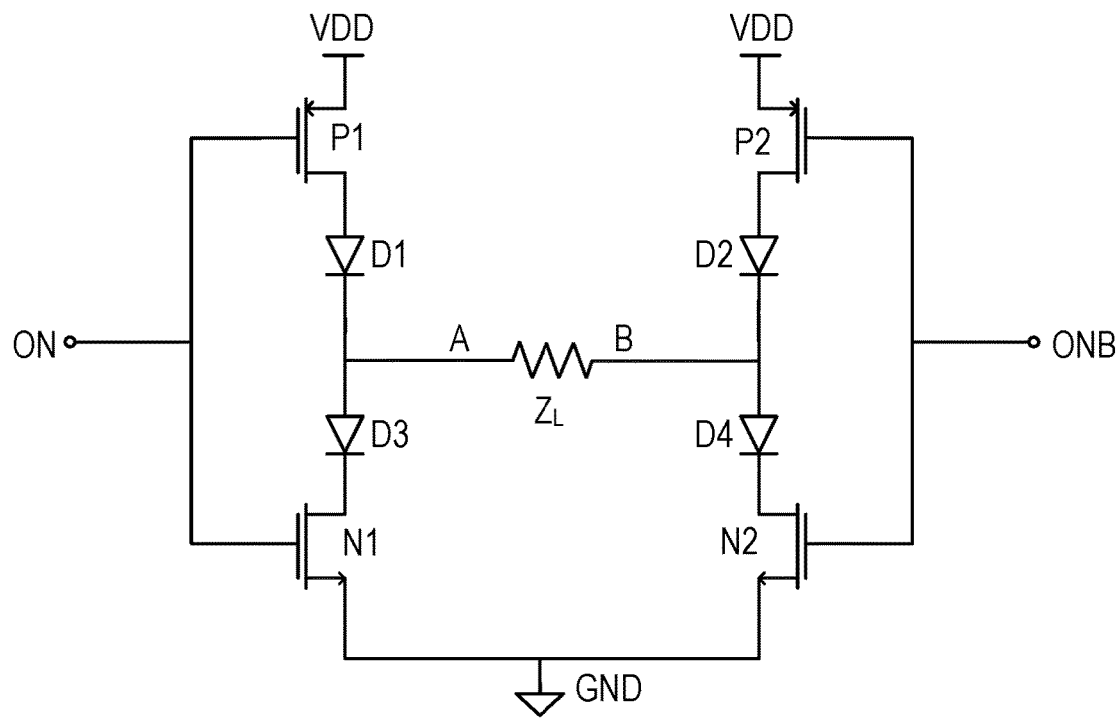
FIG. 1B illustrates a convention RS485 driver.

FIG. 3 illustrates a circuit for use with the RS485 standard. The terminals of the load $Z_L$ are connected to VDD and GND to generate one polarity or GND and VDD respectively to generate the complementary polarity. Thus, node A 301 is coupled to VDD through MP1 and MN2 when ON is low and node B 303 is coupled to GND through MP22 and MN12 (ONB is high). When ON is high, node A is coupled to ground through MP2 and MN1 and node B is coupled to VDD through MN22 and MP12. The RS485 driver shown in FIG. 3 uses four body diodes MN2, MP2, MN22, and MP22 to replace switches P1, P2, N1, and N2 shown in FIG. 1B.

In FIG. 3 the reverse current circuit 209A for MN2 is the same as the reverse current circuit 209. The reverse current circuit 209B for MN22 is the same as reverse current circuit 209 (FIG. 2) except the comparator 211 receives an indication of the voltage at node B instead of node A. The reverse current circuit 221A for MP2 is the same as reverse current circuit 221 (FIG. 2) except the comparator 223 receives an indication of the voltage at node A instead of node B. The reverse current circuit 221B for MP22 is the same as the reverse current circuit 221 (FIG. 2).

Figure 4:
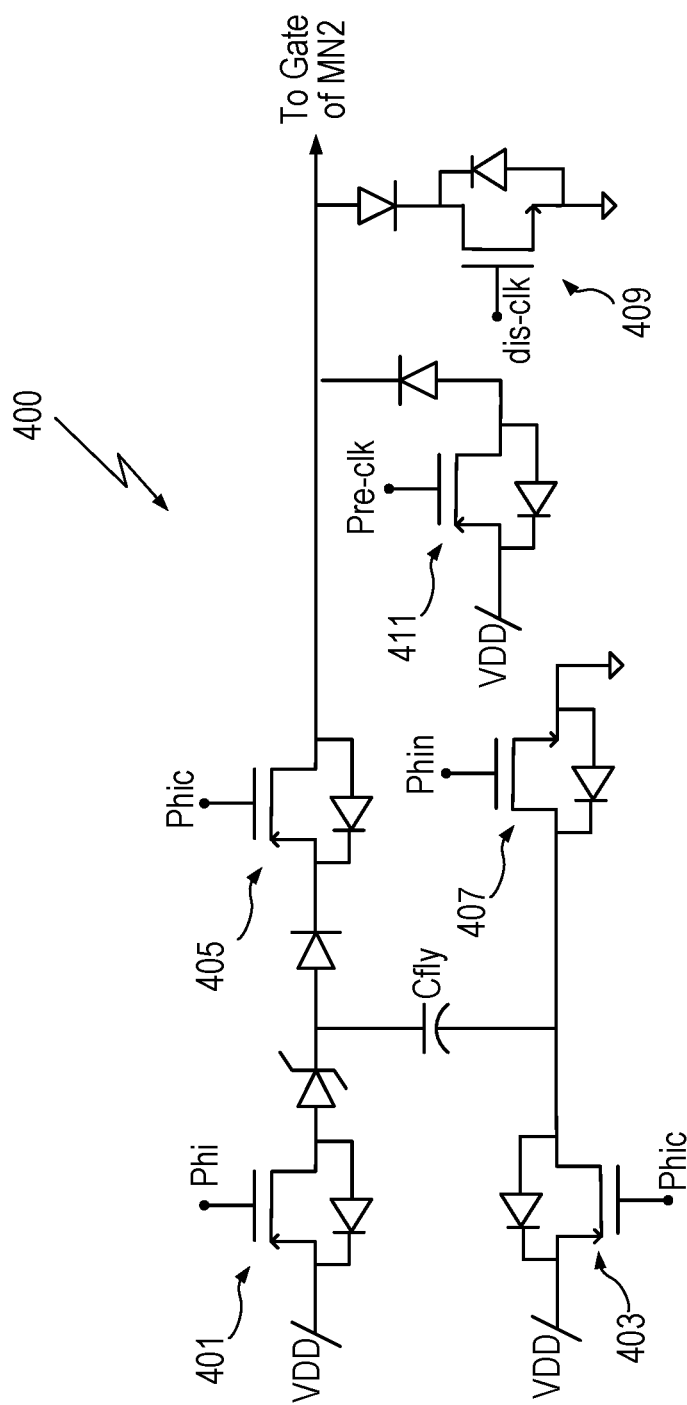
FIG. 4 illustrates a charge pump circuit for use with the CAN driver and/or the RS485 driver.

FIG. 4 illustrates an example of a charge pump circuit 400 used for boost circuit 205. Charge pump circuit 400 boosts the voltage supplied to MN2 to approximately twice VDD. In a first phase, transistors 401 and 407 are on. In a second phase transistors 403 and 405 are on and supply the charge to the gate of MN2. Transistor 409, corresponding to switch 215 in FIG. 2, discharges the gate of MN2 to ground when the signal dis-clk, e.g., from the output of comparator 211 (see FIG. 2), is asserted. Transistor 411 allows the gate of transistor MN2 to be charged when the signal Pre-clk is asserted.

In embodiments, the manner in which voltage on the gates of MN2/MP2 is boosted differs for the case of CAN and RS485. Since the CAN standard requires the driver to completely turn off—or disconnect—from the bus on every high to low transition (called Dominant to Recessive per the CAN standard) in an embodiment the gates of MN2/MP2 are boosted on every Low to High transition and discharged on every high to low transition. On the other hand, the RS485 standard does not disconnect the Driver from the bus during the time it is actively transmitting, only signal polarity is reversed. Thus, the boost circuit only needs to charge the gates of MN2/MP2 one time, when the driver is enabled, or for refreshing the charge on the gate when needed.

Figure 5:
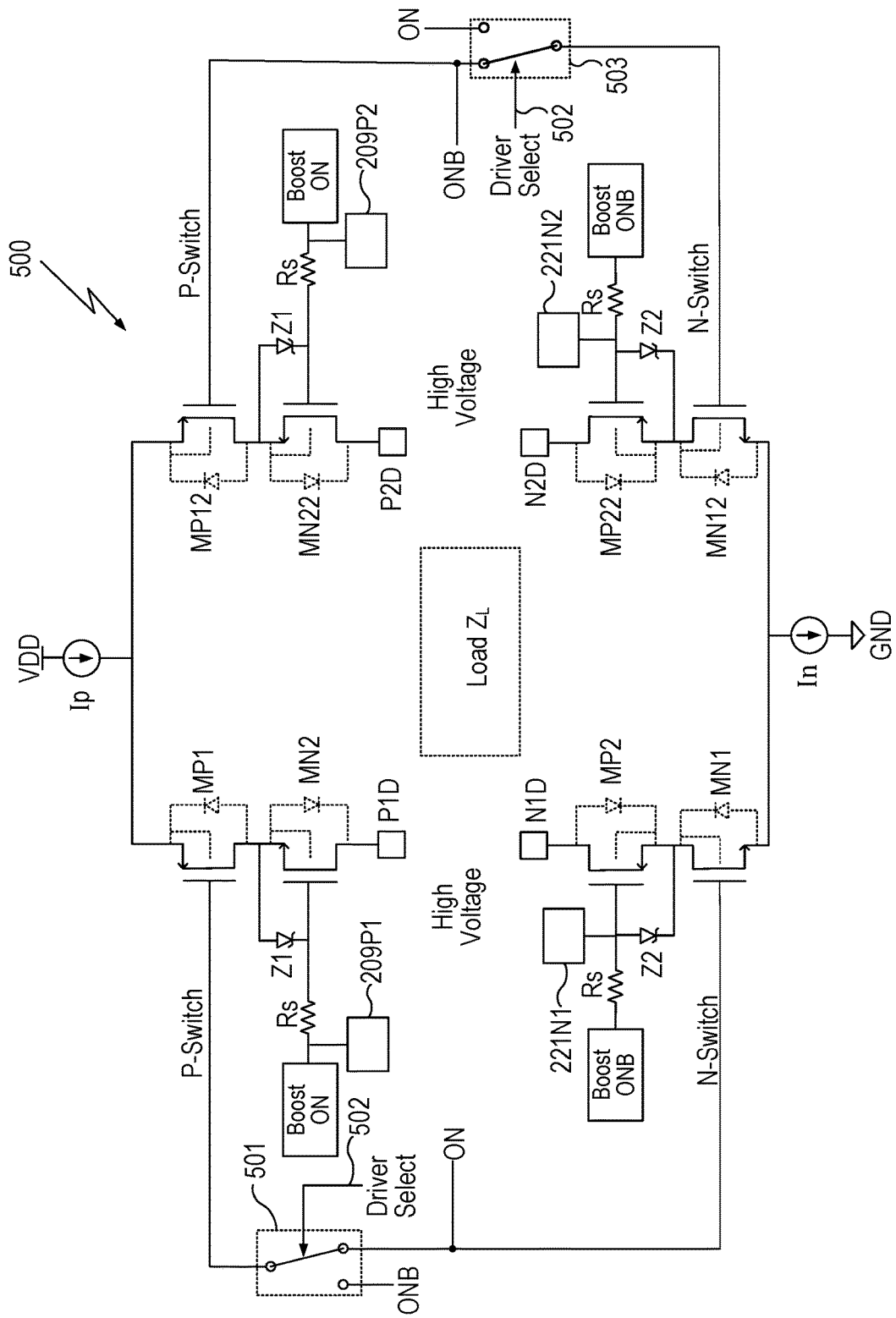
FIG. 5 illustrates a driver circuit that can be used as a CAN or RS485 driver.
Figure 6A:
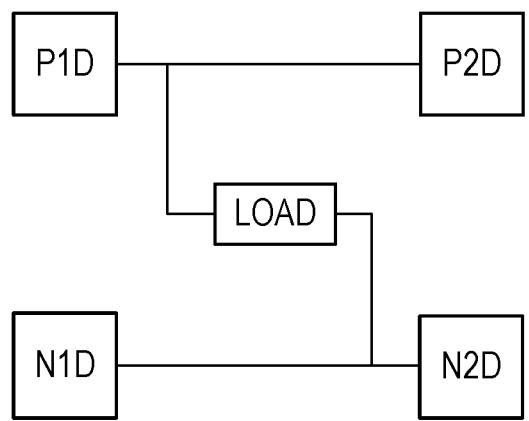
FIG. 6A illustrates a pad configuration for using the driver circuit of FIG. 5 in a CAN configuration.
Figure 6B:
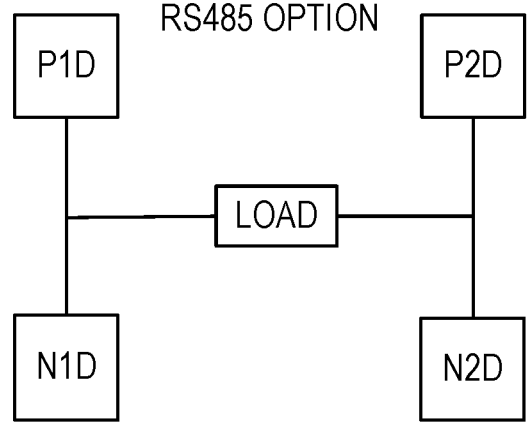
FIG. 6B illustrates a pad configuration for using the driver circuit of FIG. 5 in RS485 driver option.

FIGS. 5, 6A, and 6B illustrate a common topology of a driver circuit that meets both CAN and RS485 standards in the same circuit implementation. FIG. 5 illustrates the driver 500 with four output pads P1D, P2D, N1D, and N2D. Depending on how these pads are connected, the driver can function either as a CAN driver or as an RS485 driver. FIG. 5 shows an embodiment in which switch 501 selects the gate control signals for MP1 and switch 503 selects the gate control for MN12 depending on whether the driver is configured as an RS485 driver or as a CAN driver according to the driver select signal 502. In the embodiment illustrated in FIG. 5, the driver select signal 502 has a value setting switches 501 and 503 to configure driver 500 as a RS485 driver. For a CAN driver, the driver select signal sets the switch 501 to supply ONB to the gate of MP1 and switch 503 is set to supply ON to the gate of MN12. In an embodiment the driver is configured for CAN or RS485 operation during manufacturing by setting the switch control signal (driver select signal) to a desired value, by, e.g., programming a fuse or otherwise writing a nonvolatile memory location. In other embodiments, the value of the switch control signal is programmed by writing a memory location that supplies the driver select signal 502 after manufacture or is pin programmable.

In FIG. 5 the reverse current circuit 209P1 for MN2 is the same as the reverse current circuit 209 (FIG. 2) except the comparator 211 receives the indication of the voltage on the output node associated with pad P1D instead of node A. The reverse current circuit 209P2 for MN22 is the same as reverse current circuit 209 (FIG. 2) except the comparator 211 receives an indication of the voltage on the output node associated with pad P2D instead of node A. The reverse current circuit 221N1 for MP2 is the same as reverse current circuit 221 (FIG. 2) except the comparator 223 receives an indication of the voltage on the output node associated with pad N1D instead of node B. The reverse current circuit 221N2 for MP22 is the same as the reverse current circuit 221 (FIG. 2) except the comparator 223 receives the indication of the voltage on the output node associated with pad N2D instead of node B.

FIG. 6A shows the pad interconnections for driver circuit 500 for a CAN driver. The embodiment of FIG. 6A has the further advantage of doubling the respective P and N switches in the CAN configuration as compared to FIG. 2, thus reducing switch resistance by a factor of two. Of course, the pad interconnections can be set so that only one of pads P1D and P2D and one of N1D and N2D are coupled to the load. FIG. 6B illustrates the driver circuit 500 in an RS485 configuration.

Figure 7:
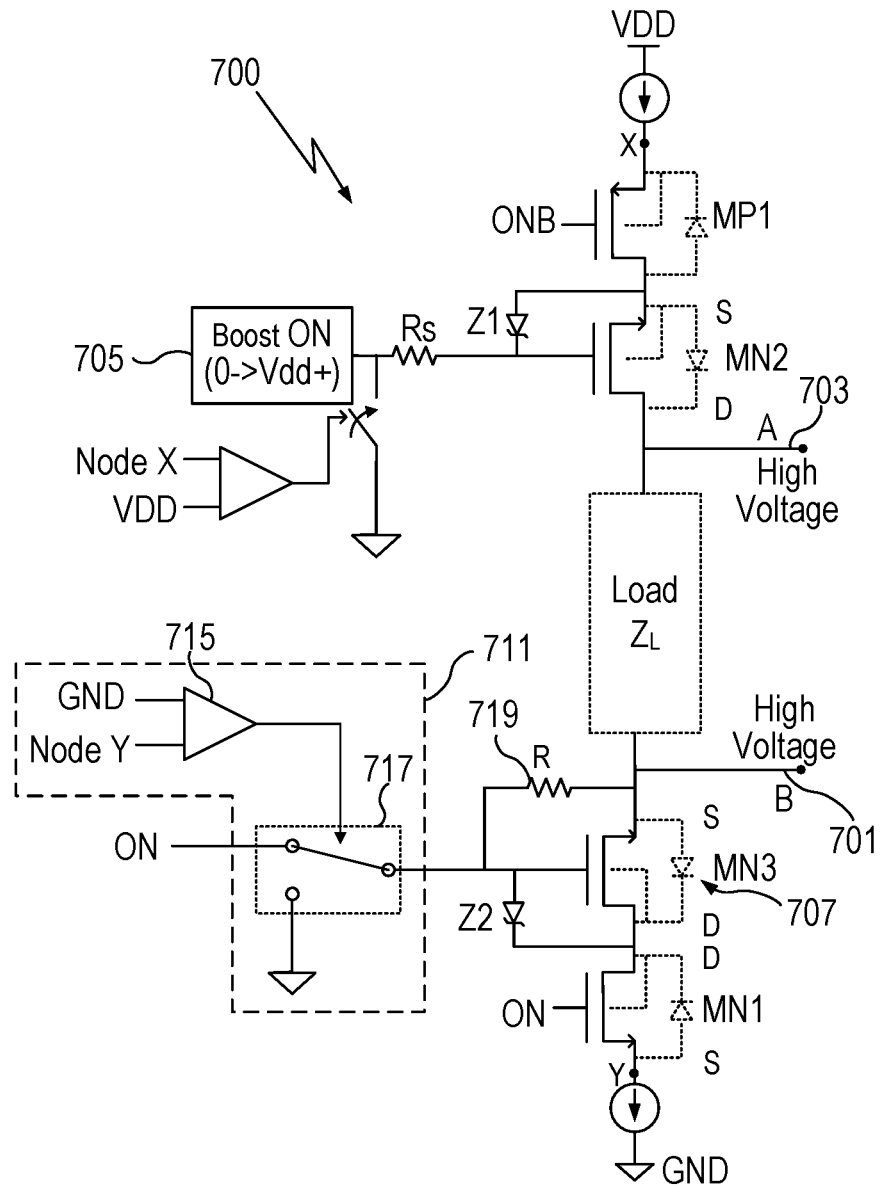
FIG. 7 illustrates another embodiment of a driver circuit in which a boost circuit is used for an active diode in only the portion of the driver circuit.

While the embodiment illustrated for the boost circuit 500 utilized boost circuits for the active diodes MN2, MP2, MN22, and MP22, in other embodiments not all of the active diode circuits need to be boosted. While the boost circuits on the pull-up and pull-down portions of the driver are particularly useful in low supply voltage environments, e.g., 3.3 V and below, in other embodiments, some or all of the boost circuits may be removed from the active diodes. For example, FIG. 7 illustrates a driver circuit 700 in which the active diode MN3 lacks a boost circuit. The pullup portion of the driver between node A 703 and the supply voltage VDD retains the boost circuit 705. In an embodiment, active diode circuit 707 replaces the diode D2 shown in FIG. 1A with transistor MN3. While some embodiments use a PMOS transistor MP2 such as shown in FIG. 2 for the active diode, the embodiment of FIG. 7 utilizes an NMOS transistor MN3 with its drain and source reversed from the transistor MN1 so the source of MN3 connects to node B 701 while the drain of MN3 connects to the drain of MN1. Reverse current flow control circuit 711 uses comparator 715 to control the voltage supplied to the gate of MN3. If the indication of the voltage node B is lower than a reference voltage such as GND, the comparator output signal causes switch 717 to couple the gate of transistor MN3 to ground to turn off transistor MN3. If a sufficiently large negative voltage is present on node B that would otherwise cause a reverse current, turning off MN3 prevents bypassing the body diode 707 and the body diode 707 blocks the reverse current. In CAN mode RECESSIVE (both N and P switches are OFF), if node B happens to be driven below GND by the bus (e.g., some other driver is holding the bus to say −12V), the resistor R 719 shorts out Vgs of the MN3 thereby turning it off automatically, preventing a large current from being drawn through combination of MN1 and MN3 from GND. Conversely, when MN3 is actively driven by asserting the gate switch 717 the resistor R is overdriven and positive voltage is deposited onto the gate of MN3 thereby quickly turning it ON.

Figure 8:
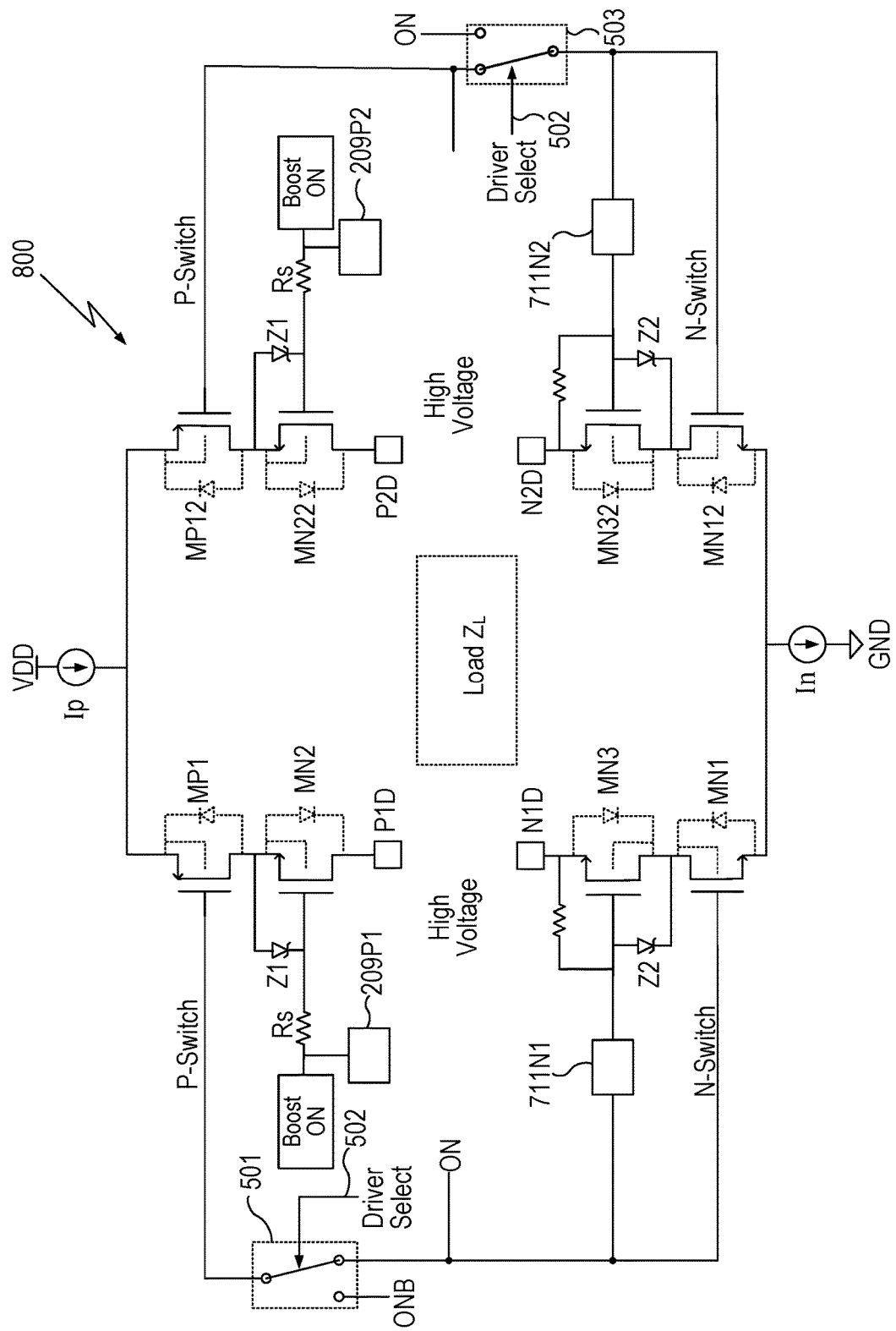
FIG. 8 illustrates another embodiment of a driver circuit configurable as a CAN or RS485 driver.

FIG. 8 illustrates a driver circuit 800 that meets both CAN and RS485 standards in the same circuit implementation. The same circuit shown in FIG. 7 can be used on each side of the driver 800 shown in FIG. 8 so the pull-up portions of the driver circuit between P1D and VDD and between P2D and VDD include a boost circuit and the pull-down portions of the driver circuit between N1D and GND and between N2D and GROUND do not have boost circuits. The driver circuit 800 includes the reverse current flow circuits 711N1 and 711N2 to control the reverse current flow for the pull-down portions of the driver circuit. The reverse current circuit 711N1 for MN3 is the same as reverse current circuit 711 (FIG. 7) except the comparator 715 receives an indication of the voltage on the output node associated with pad N1D instead of node B. The reverse current circuit 711N2 for MN32 is the same as the reverse current circuit 711 (FIG. 7) except the comparator 715 receives the indication of the voltage on the output node associated with pad N2D instead of node B.

Referring again to, e.g., FIGS. 3, 5, 8, in embodiments the current sources Ip and In function only as current sources. In other embodiments, the current sources function in two modes, as either low resistance voltage switches or as current sources. Operating in voltage mode (working as a voltage switch) produces improved headroom but the current that can be drawn from the A or B terminals is unlimited in case outputs are short circuited. If a short circuit current limit is reached for either positive short circuit current or negative short circuit, the voltage switches turn into current sources by applying a different gate voltage bias in current source mode than in voltage switch mode.

Thus, various aspects have been described relating to a driver circuit for use in CAN and RS485 environments. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. An apparatus comprising:
   a driver circuit including a first pull-up portion, the first pull-up portion including,
      a first transistor having a first current carrying terminal coupled to a first supply voltage node and having a second current carrying terminal coupled to a third current carrying terminal of a second transistor;
      the second transistor having a fourth current carrying terminal coupled to an output node of the driver circuit;
      a reverse current control circuit to turn off the second transistor responsive to a first voltage associated with an output voltage on the output node being higher than a reference voltage thereby indicating that the output voltage is higher than a first supply voltage on the first supply voltage node; and
      a first body diode associated with the second transistor to block a first reverse current from flowing between the output node and the first supply voltage node when the second transistor is off and the output voltage is higher than the first supply voltage.

2. The apparatus as recited in claim 1 wherein the first voltage is sensed at a node between the first supply voltage node and the first transistor.

3. The apparatus as recited in claim 1,
   wherein the first transistor is of a first type, and wherein the first current carrying terminal is a source of the first transistor and the second current carrying terminal is a drain of the first transistor; and
   wherein the second transistor is of a second type and the third current carrying terminal is a source of the second transistor and the fourth current carrying terminal is a drain of the second transistor.

4. The apparatus as recited in claim 3 wherein the first type is PMOS and the second type is NMOS.

5. The apparatus as recited in claim 1 wherein the reverse current control circuit comprises:
   a comparator to compare the reference voltage to the first voltage and close a switch to discharge a gate of the second transistor to turn off the second transistor.

6. The apparatus as recited in claim 1 further comprising:
   a boost circuit to boost a gate voltage supplied to a gate terminal of the second transistor to be above the first supply voltage.

7. The apparatus as recited in claim 1 further comprising:
   a first pull-down portion, the first pull-down portion including,
      a third transistor having a fifth current carrying terminal coupled to a second supply voltage node and a sixth current carrying terminal coupled to a seventh current carrying terminal of a fourth transistor;
      the fourth transistor having an eighth current carrying terminal coupled to a second output node of the driver circuit;
      a second reverse current control circuit to turn off the fourth transistor responsive to a second voltage associated with a second output voltage on the second output node being lower than a second reference voltage, thereby indicating that the second output voltage is lower than a second supply voltage on the second supply voltage node, to thereby prevent a second reverse current from flowing the second supply voltage node; and
      a second body diode associated with the fourth transistor to block the second reverse current when the fourth transistor is off and the second output voltage is lower than the second supply voltage to thereby prevent a second reverse current from flowing between the second supply voltage node and the second output node.

8. The apparatus as recited in claim 7,
   wherein the third transistor is of a second type having a source coupled to the second supply voltage node;
   wherein the fourth transistor is of the second type and a drain of the third transistor is coupled to a drain of the fourth transistor; and
   wherein the source of the fourth transistor is coupled to the second output node.

9. The apparatus as recited in claim 7,
   wherein the third transistor is of a second type having a source coupled to the second supply voltage node; and
   wherein the fourth transistor is of a first type and a source of the fourth transistor is coupled to a drain of the third transistor and a drain of the fourth transistor is coupled to the second output node.

10. The apparatus as recited in claim 7 further comprising:
    a second pull-up portion of the driver circuit, the second pull-up portion including,
       a fifth transistor having a ninth current carrying terminal coupled to the first supply voltage node and having a tenth current carrying terminal coupled to an eleventh current carrying terminal of a sixth transistor;
       the sixth transistor having a twelfth current carrying terminal coupled to a third output node of the driver circuit; and
    a third reverse current control circuit to turn off the sixth transistor responsive to a third voltage associated with the third output node being higher than a third reference voltage.

11. The apparatus as recited in claim 10 further comprising:
a second pull-down portion, the second pull-down portion including,
a seventh transistor, a first current carrying terminal of the seventh transistor coupled to the second supply voltage node;
an eighth transistor, a first current carrying terminal of the eighth transistor coupled to a second current carrying terminal of the seventh transistor and a second current carrying terminal of the eighth transistor coupled to a fourth output node of the driver circuit; and
a fourth reverse current control circuit to turn off the eighth transistor responsive to a fourth voltage associated with the fourth output node being lower than a fourth reference voltage.

12. The apparatus as recited in claim 11 wherein the first pull-up portion of the driver circuit and the second pull-up portion of the driver circuit are coupled in parallel between the first supply voltage node and a first load terminal.

13. The apparatus as recited in claim 11 wherein the first pull-up portion of the driver circuit and the first pull-down portion of the driver circuit are coupled to a first load terminal.

14. An apparatus comprising:
a driver circuit including,
a first pull-up portion, the first pull-up portion including,
a first transistor coupled between a first supply voltage node and a second transistor;
the second transistor serially coupled between the first transistor and a first output node of the driver circuit;
a first reverse current control circuit to turn off the second transistor responsive to a first voltage associated with a first output voltage on the first output node being higher than a first reference voltage, thereby indicating that the first output voltage is higher than a first supply voltage on the first supply voltage node;
a first body diode associated with the second transistor to prevent an undesired reverse current from flowing between the first output node and the first supply voltage node when the second transistor is off and the first output voltage is higher than the first supply voltage;
a second pull-up portion, the second pull-up portion including,
a third transistor coupled between the first supply voltage node and a fourth transistor;
the fourth transistor serially coupled between the third transistor and a second output node of the driver circuit;
a second reverse current control circuit to turn off the fourth transistor responsive to a second voltage associated with a second output voltage of the second output node being higher than a second reference voltage, thereby indicating the second output voltage is higher than the first supply voltage, to thereby prevent a second reverse current from flowing between the second output node and the first supply voltage node using a second body diode associated with the fourth transistor to block the second reverse current;
a first pull-down portion, the first pull-down portion including,
a fifth transistor coupled between a second supply voltage node and a sixth transistor;
the sixth transistor serially coupled between the fifth transistor and a third output node of the driver circuit;
a third reverse current control circuit to turn off the sixth transistor responsive to a third voltage associated with a third output voltage of the third output node being lower than a third reference voltage, thereby indicating that the third output voltage is lower than a second supply voltage of the second supply voltage node, to thereby prevent a third reverse current from flowing between the third output node and the second voltage supply node using a third body diode associated with the sixth transistor to block the third reverse current; and
a second pull-down portion, the second pull-down portion including,
a seventh transistor coupled between the second voltage supply node and an eighth transistor;
the eighth transistor coupled between the seventh transistor and a fourth output node of the driver circuit; and
a fourth reverse current control circuit to turn off the eighth transistor responsive to a fourth voltage associated with a fourth output voltage of the fourth output node being lower than a fourth reference voltage, thereby indicating that the fourth output voltage is lower than the second supply voltage, to thereby prevent a fourth reverse current from flowing between the fourth output node and the second voltage supply node using a fourth body diode associated with the eighth transistor to block the fourth reverse current.

15. The apparatus as recited in claim 14 wherein the first reference voltage and the second reference voltage are equal and the third reference voltage and the fourth reference voltage are equal.

16. The apparatus as recited in claim 14 further comprising:
a first pad coupled to the first output node;
a second pad coupled to the second output node;
a third pad coupled to the third output node;
a fourth pad coupled to the fourth output node;
wherein the first and second pads are coupled to a first node of a load; and
wherein the second and third pads are coupled to a second node of the load.

17. The apparatus as recited in claim 14 further comprising:
a first pad coupled to the first output node;
a second pad coupled to the second output node;
a third pad coupled to the third output node;
a fourth pad coupled to the fourth output node;
wherein the first and third pads are coupled to a first node of a load; and
wherein the second and fourth pads are coupled to a second node of the load.

18. The apparatus as recited in claim 14 further comprising:
a first switch circuit to select as a first transistor gate signal a gate signal according to a first value of a driver select signal and to select a complement of the gate signal according to a second value of the driver select signal and a second switch to select as an eighth transistor gate signal, the complement of the gate signal according to the first value of the driver select signal and to select the gate signal according to the second value of the driver select signal.

19. A method of operating a driver circuit comprising:
selectively coupling a supply voltage node to an output node through a first transistor and through a second transistor according to a first gate control signal for the first transistor and a second gate control signal for the second transistor, the second transistor serially coupled between the first transistor and the output node; and
turning off the second transistor responsive to an indication that an output voltage on the output node is higher than a supply voltage on the supply voltage node to thereby block a reverse current from the output node to the supply voltage node using a body diode of the second transistor to block the reverse current.

20. The method as recited in claim 19 further comprising boosting a voltage of the second gate control signal above the supply voltage.

* * * * *